US010423892B2

United States Patent
Xu et al.

(10) Patent No.: US 10,423,892 B2
(45) Date of Patent: Sep. 24, 2019

(54) TRAJECTORY CLUSTER MODEL FOR LEARNING TRAJECTORY PATTERNS IN VIDEO DATA

(71) Applicant: Omni AI, Inc., Dallas, TX (US)

(72) Inventors: Gang Xu, Houston, TX (US); Ming-Jung Seow, Richmond, TX (US); Tao Yang, Katy, TX (US); Wesley Kenneth Cobb, The Woodlands, TX (US)

(73) Assignee: Omni AI, Inc., Houston, TX (US)

( * ) Notice: Subject to any disclaimer, the term of this patent is extended or adjusted under 35 U.S.C. 154(b) by 104 days.

(21) Appl. No.: 15/090,862

(22) Filed: Apr. 5, 2016

(65) Prior Publication Data
US 2017/0286781 A1 Oct. 5, 2017

(51) Int. Cl.
*G06K 9/00* (2006.01)
*G06N 20/00* (2019.01)
*G06K 9/62* (2006.01)
*G08B 13/196* (2006.01)
*G06K 9/32* (2006.01)

(52) U.S. Cl.
CPC ......... *G06N 20/00* (2019.01); *G06K 9/00771* (2013.01); *G06K 9/6212* (2013.01); *G06K 2009/00738* (2013.01); *G06K 2009/3291* (2013.01); *G08B 13/19613* (2013.01)

(58) Field of Classification Search
None
See application file for complete search history.

(56) References Cited

U.S. PATENT DOCUMENTS

| | | | | |
|---|---|---|---|---|
| 2011/0064267 A1* | 3/2011 | Cobb | ................. | G06K 9/00771 382/103 |
| 2012/0108261 A1* | 5/2012 | Miyake | ................. | H04W 4/028 455/456.1 |
| 2012/0170802 A1* | 7/2012 | Millar | ................. | G06K 9/00785 382/103 |
| 2013/0260791 A1* | 10/2013 | Malinovskiy | ........... | H04W 4/02 455/456.1 |

\* cited by examiner

*Primary Examiner* — Wei Wen Yang

(57) ABSTRACT

Techniques are disclosed for analyzing and learning behavior in an acquired stream of video frames. In one embodiment, a trajectory analyzer clusters trajectories of objects depicted in video frames and builds a trajectory model including the trajectory clusters, a prior probability of assigning a trajectory to each cluster, and an intra-cluster probability distribution indicating the probability that a trajectory mapping to each cluster is least various distances away from the cluster. Given a new trajectory, a score indicating how unusual the trajectory is may be computed based on the product of the probability of the trajectory mapping to a particular cluster and the intra-cluster probability of the trajectory being a computed distance from the cluster. The distance used to match the trajectory to the cluster and determine intra-cluster probability is computed using a parallel Needleman-Wunsch algorithm, with cells in antidiagonals of a matrix and connected sub-matrices being computed in parallel.

20 Claims, 6 Drawing Sheets

TRAJECTORY CLUSTER MODEL FOR LEARNING TRAJECTORY PATTERNS IN VIDEO DATA

BACKGROUND OF THE INVENTION

Field of the Invention

Embodiments of the invention provide techniques for analyzing a sequence of video frames and, more particularly, to analyzing and learning trajectory patterns based on streaming video data.

Description of the Related Art

Some currently available video surveillance systems provide simple object recognition capabilities. For example, a video surveillance system may be configured to classify a group of pixels (referred to as a "blob") in a given frame as being a particular object (e.g., a person or vehicle). Once identified, a "blob" may be tracked from frame-to-frame in order to follow the "blob" moving through the scene over time, e.g., a car passing across the field of vision of a video surveillance camera. Further, such systems may be configured to determine when an object has engaged in certain predefined behaviors. For example, the system may include definitions used to recognize the occurrence of a number of pre-defined events, e.g., the system may evaluate the appearance of an object classified as depicting the car (a vehicle-appear event) coming to a stop over a number of frames (a vehicle-stop event). However, such systems are unable to autonomously learn object trajectory patterns so that occurrences of unusual trajectories, such as the trajectory of a car driving the wrong direction or stopping at an unusual location, can be reported to user.

SUMMARY OF THE INVENTION

One embodiment provides a method for analyzing trajectories of objects in a scene depicted in video frames captured by a video camera. The method generally includes determining, based on a distance measure between a received trajectory and a stored trajectory cluster, whether the received trajectory maps to the stored trajectory cluster. The method further includes, if the received trajectory indeed maps to the stored trajectory cluster: determining a score based on a cumulative probability distribution indicating probability of the received trajectory being at least the first distance from the stored trajectory cluster, and issuing an alert if the score exceeds a threshold of rareness measures learned from historical data.

Other embodiments include a computer-readable medium that includes instructions that enable a processing unit to implement one or more embodiments of the disclosed method as well as a system configured to implement one or more embodiments of the disclosed method.

BRIEF DESCRIPTION OF THE DRAWINGS

So that the manner in which the above recited features, advantages, and objects of the present invention are attained and can be understood in detail, a more particular description of the invention, briefly summarized above, may be had by reference to the embodiments illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
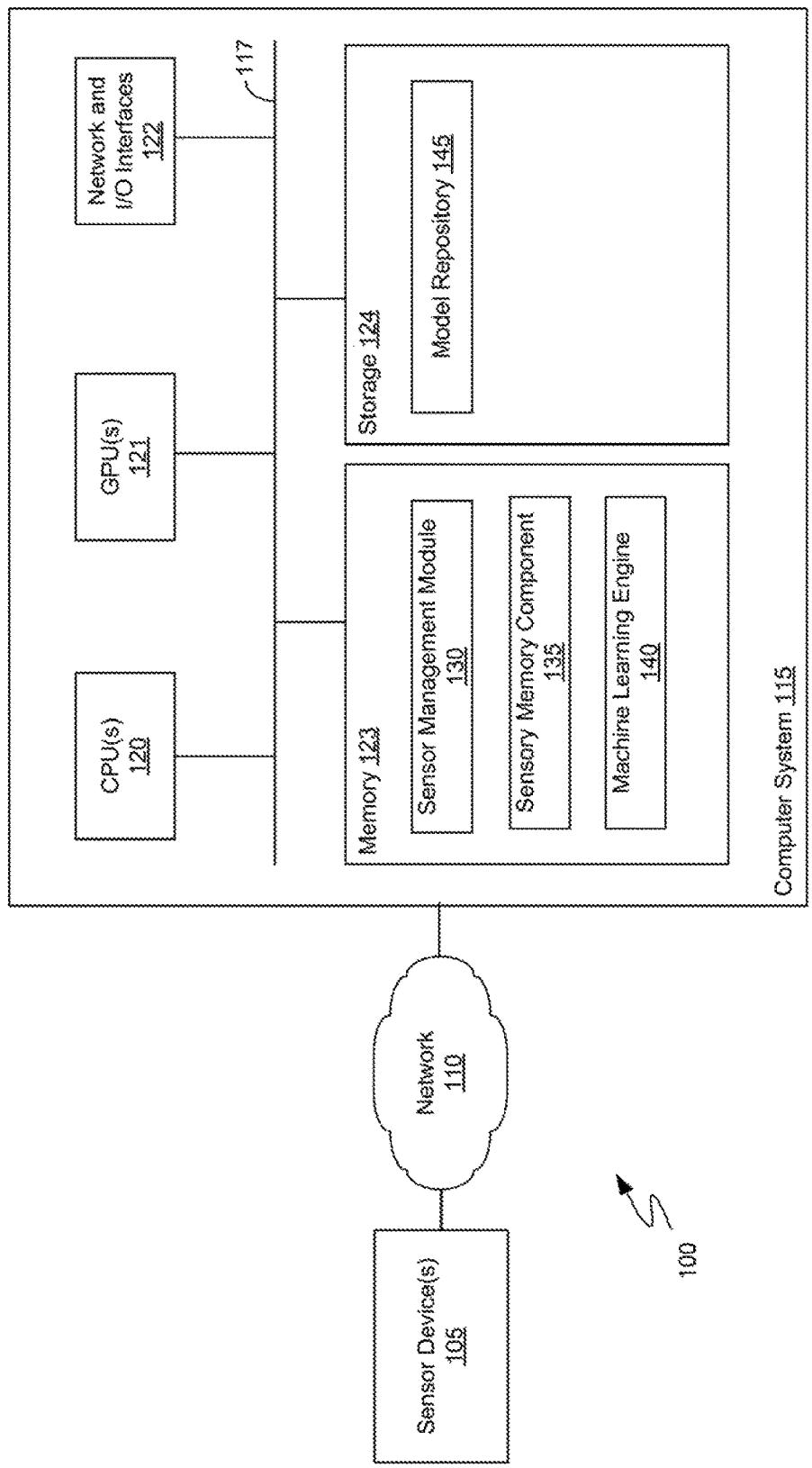
FIG. 1 illustrates components of a video analysis system, according to an embodiment.

Embodiments of the present invention provide a method and a system for analyzing and learning behavior based on an acquired stream of video frames. A machine-learning video analytics system may be configured to observe a scene, generate information streams of observed activity, and pass the streams to a machine learning engine. In turn, the machine learning engine may engage in an undirected and unsupervised learning approach to learn patterns regarding the object behaviors in that scene. Thereafter, when unexpected (i.e., abnormal or unusual) behavior is observed, alerts may be generated.

In one embodiment, the machine learning engine includes a trajectory analyzer module responsible for building a trajectory model which includes clusters of trajectories, a prior probability measure of assigning a trajectory to each trajectory cluster based on a count of trajectories that previously mapped to the cluster and a temporal decay, and an intra-cluster probability distribution for each cluster indicating, for various distances, the probability that a trajectory mapping to the cluster is at least the distance away from the cluster. Given a new trajectory, the trajectory analyzer determines an anomaly score indicating how unusual the new trajectory is based on a joint probability computed as a product of the prior probability of the trajectory matching to a particular cluster (or to a best-match cluster if the trajectory does not map to any mature cluster) and the intra-cluster probability of the trajectory being at least the distance that the trajectory is determined to be from the matching trajectory cluster. In one embodiment, the distance used to match a trajectory to a trajectory cluster and to determine the intra-cluster probability for the anomaly score may be computed using a dynamic programming Needleman-Wunsch algorithm that finds a best match/alignment between trajectories (or between a trajectory and a trajectory cluster), with cells in antidiagonals of the Needleman-Wunsch algorithm matrix, and all connected sub-matrices, being computed in parallel. Unusual trajectories having anomaly scores above an adaptive threshold may be reported to a user so that the user can, e.g., investigate the causes of the unusual trajectories. For example, objects (e.g., cars) in a scene moving in the wrong direction or moving with abnormal trajectories may be reported to a user.

In the following, reference is made to embodiments of the invention. However, it should be understood that the invention is not limited to any specifically described embodiment. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Examples of computer-readable storage media include (i) non-writable storage media (e.g., read-only memory devices within a computer such as CD-ROM or DVD-ROM disks readable by an optical media drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other examples media include communications media through which information is conveyed to a computer, such as through a computer or telephone network, including wireless communications networks.

In general, the routines executed to implement the embodiments of the invention may be part of an operating system or a specific application, component, program, module, object, or sequence of instructions. The computer program of the present invention is comprised typically of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 illustrates components of a behavioral recognition system 100, according to some embodiments. As shown, the behavioral recognition system 100 includes one or more input source devices 105, a network 110, and a computer system 115. The network 110 may transmit data from the source devices 105 to the computer system 115. Computer system 115 is generally representative of one or more physical computer systems connected via a network (e.g., the Internet, wireless networks, local area networks). Alternatively, the computer system 115 may be a cloud computing resource connected via the network 110. Illustratively, the computer system 115 includes one or more central processing units (CPU) 120, one or more graphics processing units (GPU) 121, network and I/O interfaces 122, a storage 124 (e.g., a disk drive, optical disk drive, and the like), and a memory 123 that includes a sensor management module 130, a sensory memory component 135, and a machine learning engine 140. The memory 123 may comprise one or more memory devices, such as system memory and graphics memory. The memory 123 is generally included to be representative of a random access memory (e.g., DRAM, SRAM, SDRAM). The memory 123 and storage 124 may be coupled to the CPU 120, GPU 121, and network and I/O interfaces 122 across one or more buses 117. The storage 124 includes a model repository 145. Additionally, storage 124, may generally include one or more devices such as a hard disk drive, solid state device (SSD), or flash memory storage drive, and may store non-volatile data as required.

The CPU 120 retrieves and executes programming instructions stored in the memory 123 as well as stores and retrieves application data residing in the storage 124. In some embodiments, the GPU 121 implements a Compute Unified Device Architecture (CUDA). Further, the GPU 121 is configured to provide general purpose processing using the parallel throughput architecture of the GPU 121 to more efficiently retrieve and execute programming instructions stored in the memory 123 and also to store and retrieve application data residing in the storage 124. The parallel throughput architecture provides thousands of cores for processing the application and input data. As a result, the GPU 121 leverages the thousands of cores to perform read and write operations in a massively parallel fashion. Taking advantage of the parallel computing elements of the GPU 121 allows the behavior recognition system 100 to better process large amounts of incoming data (e.g., input from a video and/or audio source). As a result, the behavior recognition system 100 may scale with relatively less difficulty.

The sensor management module 130 provides one or more data collector components. Each of the data collector components is associated with a particular input data source, e.g., a video source, a SCADA (supervisory control and data acquisition) source, an audio source, a network traffic source, etc. The collector components may retrieve (or receive, depending on the sensor) input data from each source at specified intervals. The sensor management module 130 further controls the communications between the data sources and normalizes the input data for transmission to the sensory memory component 135.

In one embodiment, the sensor management module 130 may include a video driver (not shown) that receives and processes video data (e.g., video stream(s), video images, or the like) from a video input source. The video input source may be a video camera, a VCR, DVR, DVD, computer, web-cam device, or the like. Generally, the area visible to the camera is referred to as the "scene." The video input source may be configured to record the scene as a sequence of individual video frames at a specified frame-rate (e.g., 24 frames per second), where each frame includes a fixed number of pixels (e.g., 320×240). Each pixel of each frame may specify a color value (e.g., an RGB value) or grayscale value (e.g., a radiance value between 0-255). Further, the video stream may be formatted using known formats including MPEG2, MJPEG, MPEG4, H.263, H.264, and the like. The video driver in sensor management module 130 may be configured to analyze such raw video frames to track active objects and their locations in the scene, identify a variety of appearance and kinematic features, derive a variety of metadata regarding the actions and interactions of such objects, among other things, and supply this information to the machine-learning engine 140. For example, techniques are known for separating a scene depicted in video frames into a static part (the scene background) and a collection of volatile parts (the scene foreground), and the video driver may be configured to use such information at each successive frame of raw video to attempt to identify objects depicted by foreground patches and track the objects' positions as they move about the scene. The video driver then may output determined tracking data specifying, e.g., a tracked subject identifier, a tracked position (x, y), a camera identifier (where video streams from multiple cameras are being received), timestamp, etc., at a fixed data rate (e.g., 4-5 data points per second).

The sensory memory component 135 is a data store that transfers large volumes of data from the sensor management module 130 to the machine learning engine 140. The sensory memory component 135 stores the data as records. Each record may include a sensor type, a sensor identifier, sample identifier, a timestamp, and a data payload. Further, the sensory memory component 135 aggregates incoming data in a time-sorted fashion. Storing incoming data from each of the data collector components in a single location where the data may be aggregated allows the machine learning engine 140 to process the data efficiently. Further, the computer system 115 may reference data stored in the sensory memory component 135 in generating alerts for anomalous activities. In some embodiments, the sensory memory component 135 may be implemented via a virtual memory file system in the memory 123. In another embodiment, the sensory memory component 135 may be implemented using a key-value store.

The machine learning engine 140 receives data output from the sensor management module 135. The machine-learning engine 140 may be configured to analyze the received data, build semantic representations of events depicted in the video frames, cluster objects in a video stream having similar visual and/or kinematic features, among other things. Over time, the machine learning engine 140 learns expected patterns of behavior for objects in the scene. Thus, over time, the machine learning engine 140 learns from these observed patterns to identify normal and/or abnormal events. That is, rather than having patterns, objects, object types, or activities defined in advance, the machine learning engine 140 builds its own model of expected behavior for, e.g., each type of object.

Note, however, FIG. 1 illustrates merely one possible arrangement of the behavior recognition system 100. For example, although the input data sources 105 are shown connected to the computer system 115 via network 110, the network 110 may not always be present or needed (e.g., an input source such as a video camera may be directly connected to the computer system 115).

Figure 2:
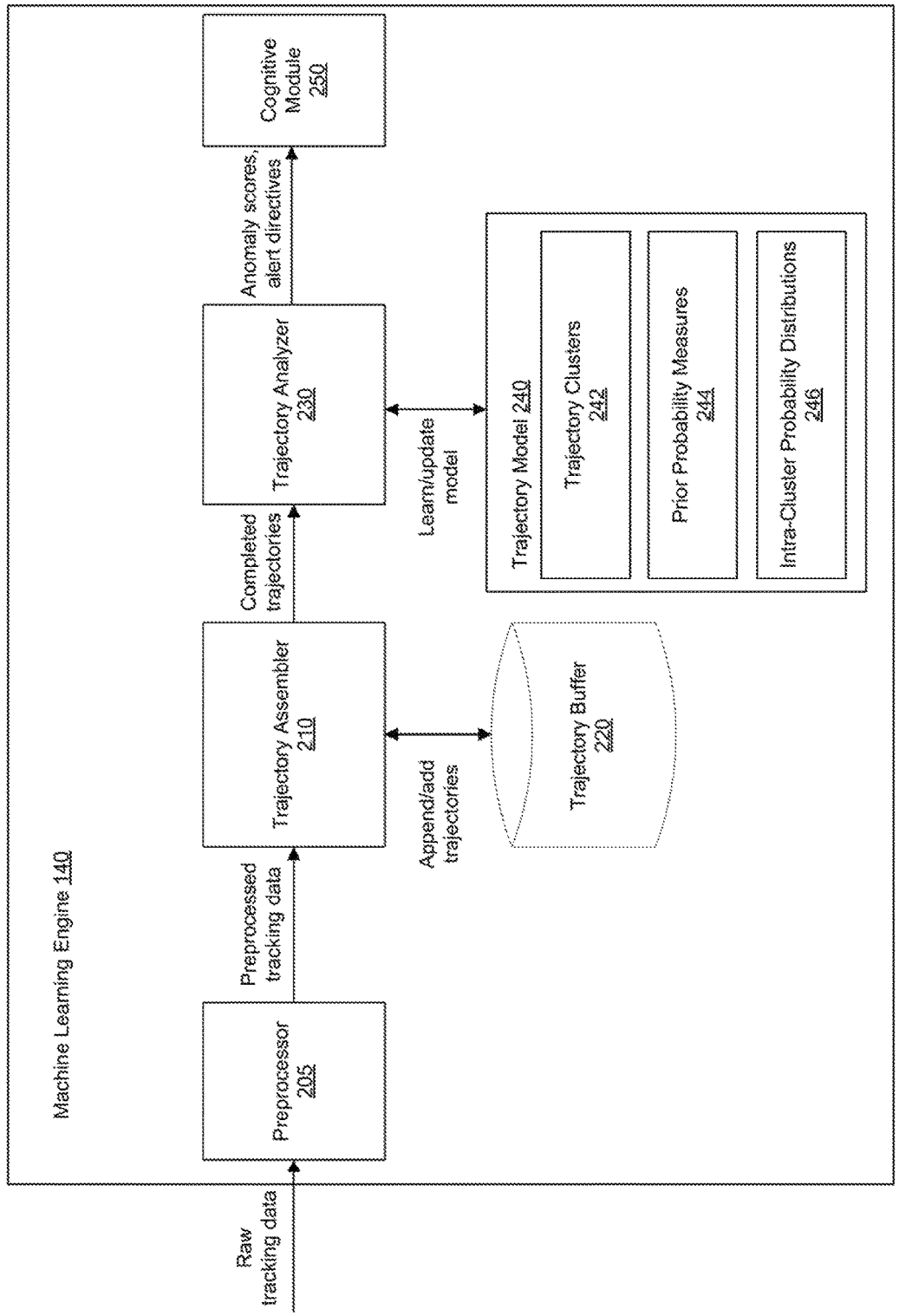
FIG. 2 further illustrates components of the video analysis system shown in FIG. 1, according to an embodiment.

FIG. 2 further illustrates components of the behavioral recognition system 100 shown in FIG. 1, according to an embodiment. It will be assumed that input source devices 105 include a video camera, and the sensor management module 130 includes a video driver (not shown) configured to process video frames captured by the video camera and output tracking data at a fixed data rate, as previously discussed. Illustratively, the machine learning engine 140 includes a preprocessing module 205, a trajectory assembler module 210, and a trajectory analyzer module 230. The preprocessing module 205 is configured to receive raw tracking data from the video driver and decimate the raw data for further processing. In one embodiment, the preprocessing module 205 may cluster the x and y coordinates of raw positions (x,y) in input tracking data and output new positions (x', y') based on the clustering. In such a case, each raw x and y value may be mapped to a cluster (or cause a new cluster to be created if no such mapping is available), and the preprocessing module 205 may output, e.g., the mean x' and y' of the matching cluster (or the new cluster) as the position (x', y') for further processing. This assumes that the clusters are mature, as the mean (x', y') of an immature cluster may be an invalid value. It should further be understood that clustering raw positions (x,y) in input tracking data to obtain new positions (x', y') is an optional step and, in other embodiments, raw tracking data may be used directly without such preprocessing.

The trajectory assembler module 210 is configured to receive (preprocessed) tracking data from preprocessor 205 and assemble trajectories for further processing. Each trajectory may include multiple tracked positions of an object. As discussed in greater detail below, the trajectory assembler 210 may assemble trajectories by determining whether an object identifier, which may include a camera identifier and a tracked subject identifier, in the received tracking data matches that of an existing trajectory stored in a trajectory buffer 220. If a matching trajectory is identified, the trajectory assembler 210 may append the (x,y) position of the received tracking data to the matching trajectory, or the trajectory assembler 210 may create a new trajectory if no matching trajectory is identified. The trajectory assembler 210 further outputs, as completed trajectories, assembled trajectories associated with objects that have disappeared from the scene and are no longer being tracked, as well as assembled trajectories exceeding a maximum length.

The trajectory analyzer 230 is configured to receive completed trajectories from the trajectory assembler 210 and build a trajectory model 240 based on the received trajectories. As shown, the trajectory model 240 includes trajectory patterns/clusters 242, which may include ordered lists of (x,y) points in a two-dimensional (image-pixel) space that represent the mean of trajectories that map to the clusters. Any feasible clustering technique may be used to create the trajectory clusters, such as the leader-follower clustering algorithm. The trajectory model 240 further includes prior probability measures 244 that indicate the probabilities of matching a received trajectory to each existing trajectory cluster. The prior probability measures 244 may be based on a count of the previous (training case) trajectories that have mapped to each cluster, as well as a temporal decay applied to the clusters. In addition, the trajectory model 240 includes intra-cluster probability distributions 246 for each existing trajectory cluster. Each intra-cluster probability distribution 246 may be a cumulative distribution function indicating, for the respective cluster, a probability of a received trajectory being at least a certain distance (also referred to herein as the matching distance) away from the cluster and, specifically, the cluster mean. That is, the intra-cluster probability distribution 246 indicates how trajectories within the cluster are distributed in terms of distance from the cluster mean. In one embodiment, the distance used to match a trajectory to a trajectory cluster and to determine the intra-cluster probability may be computed using dynamic programming, e.g., the Needleman-Wunsch algorithm, in which cells in antidiagonals of the Needleman-Wunsch algorithm matrix, and all connected submatrices, are computed in parallel. In alternative embodiments, other measures of distance may be used, such as Hamming distance, Euclidean distance, and the like.

As discussed in greater detail below, the trajectory analyzer 230 is further configured to compute anomaly scores and send such scores to a cognitive module 250. The cognitive module 250 is configured to learn observed trajectories and their anomaly scores and report to a user unusual trajectories, such as trajectories having anomaly scores above an adaptive threshold (or below a threshold if appropriate), or trajectories matching a predefined alert directive specifying a particular type of trajectory to report. In one embodiment, the adaptive threshold may be determined based on anomaly score statistics and other constraints, such as constraints that prevent overburdening alert volumes and the like, and the cognitive module 250 may report, via a user interface, trajectories whose anomaly scores exceed the determined threshold. For example, the cognitive module 250 may report trajectories associated with anomaly scores that are greater than a threshold beyond which only a small fraction (e.g., 0.02%) of previous anomaly scores were observed, provided that certain constraints are satisfied.

Figure 3:
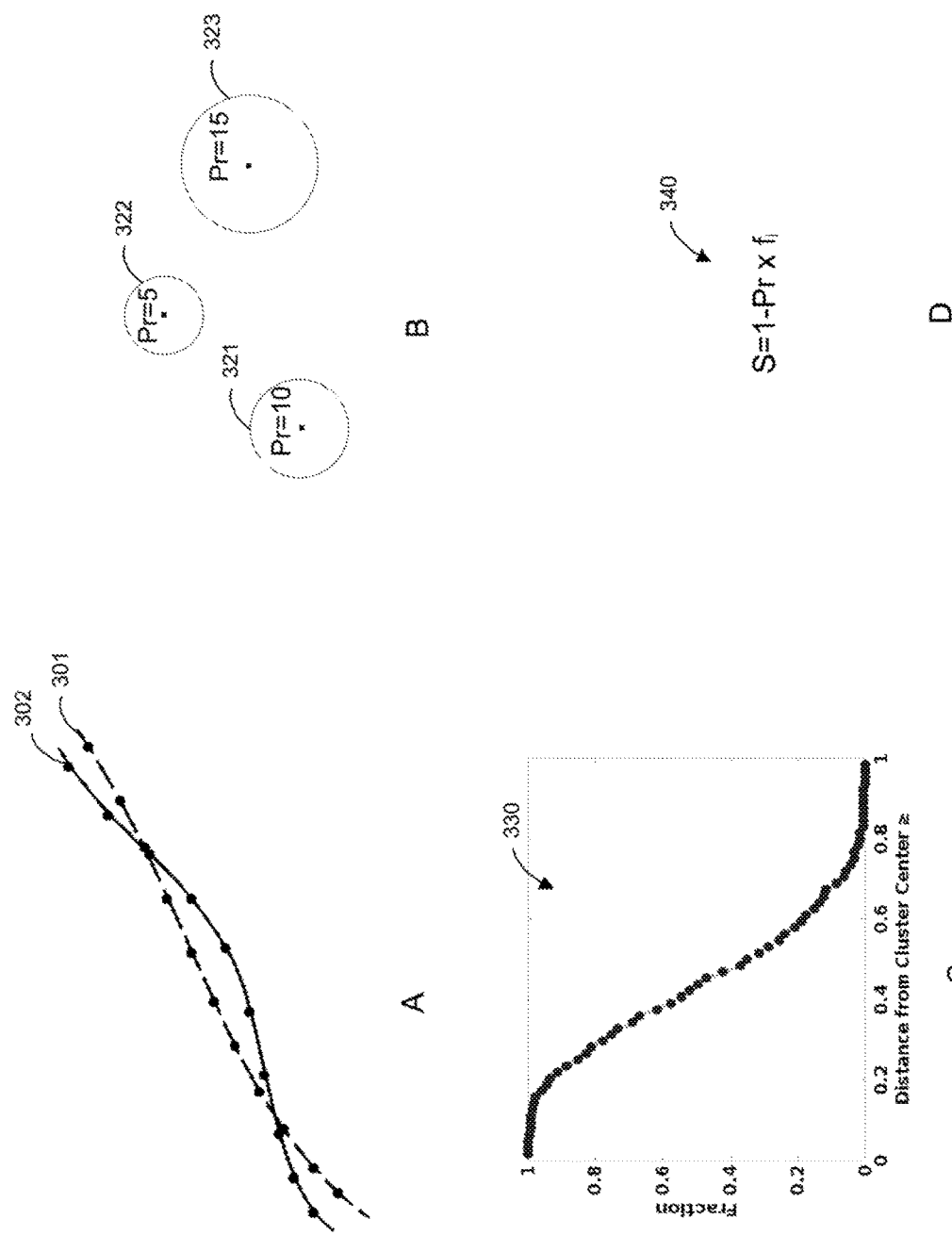
FIG. 3 illustrates an approach for computing an anomaly score for a trajectory, according to an embodiment.

FIG. 3 illustrates an approach for computing an anomaly score for a trajectory, according to an embodiment. In one embodiment, the anomaly score may be one minus a joint probability computed as the product of a prior probability of a trajectory matching an existing trajectory cluster to which it maps (or matching to a best-match cluster if the trajectory does not map to any existing cluster) and an intra-cluster probability of the trajectory being at a computed distance from the matching (or best-match) cluster, specifically the cluster's mean.

As shown in panel A, trajectory analyzer 230 matches a trajectory 301 that is assembled by the trajectory assembler 210 to a trajectory cluster based on a distance from the trajectory cluster. The trajectory clusters themselves may be obtained using any feasible clustering technique, such as the leader follower clustering algorithm. In one embodiment, each of the trajectory clusters includes an ordered list of (x,y) points in a two-dimensional (image-pixel) space. The ordered list $[(x_1, y_1), (x_2, y_2) \ldots (x_n, y_n)]$ may represent a mean of trajectories that previously mapped to the cluster and may be updated when new trajectories map to the cluster. In such a case, the trajectory analyzer 230 may determine the distance between such a mean and the trajectory 301 and match the trajectory 301 to the cluster if the determined distance is less than a threshold. In one embodiment, discussed in greater detail below, the distance measurement may be made using a parallel implementation of the Needleman-Wunsch algorithm for finding best matches/alignments between trajectories (or between trajectories and trajectory cluster means), in which cells in antidiagonals of the Needleman-Wunsch algorithm matrix and all connected sub-matrices are computed in parallel.

Panel B shows example trajectory clusters 321, 322, and 323 and trajectories that have mapped to those clusters. In one embodiment, a prior probability Pr of a trajectory matching a cluster may be based on a count of the number of trajectories that have previously matched to the cluster. Illustratively, the prior probability of clusters 321, 322, and 323, are 10, 5, and 15, respectively, representing the 10, 5, and 15 trajectories that have previously mapped to those clusters.

Panel C shows an intra-cluster probability distribution 330 of matching distances. Such an intra-cluster probability distribution 330 is a cumulative probability distribution indicating, for various matching distances, the probability of a received trajectory being at least the distance away from a particular cluster's mean. In one embodiment, the intra-cluster probability distribution may be obtained from a histogram indicating the number of trajectories matching the particular cluster that have been at least various matching distances from the cluster's mean. In such a case, the intra-cluster probability distribution may be stored as a list of pair values $[(d_1, f_1), (d_2, f_2) \ldots (d_n, f_n)]$, where $d_n$ is the (normalized) distance from the cluster mean and $f_n$ is the fraction of trajectories matching the cluster and having distances greater than or equal to $d_n$. Although the intra-cluster probability distribution 330 is shown in FIG. 3 up to a distance of 1, it should be understood that greater distances may also be accounted for with, e.g., an exponential decay function that gives the intra-cluster probability for distances greater than 1.

Panel D shows determining the anomaly score S based on a product of the prior probability Pr, of the received trajectory matching the trajectory cluster to which it maps, assuming the matching cluster is mature, and the intra-cluster probability $f_i$ of the trajectory being at a computed distance from the matching cluster's mean. It should be understood that the product of the prior probability and the intra-cluster probability is a joint probability giving the combined probability of the trajectory mapping to the cluster and being of at least a computed distance from that cluster's mean.

As discussed, the prior probability may be based on a count of the number of trajectories that have previously been matched to the cluster and a cluster decay, and the intra-cluster probability distribution may be based on a histogram indicating the number of trajectories mapping to the cluster that have been at least various distances from the cluster mean. Both prior probabilities and the intra-cluster probability distributions may be built and stored as part of the trajectory model 240, and the anomaly score may be based on a joint probability computed as a product of the prior probability and the intra-cluster probability for the received trajectory, as follows:

$$S = 1.0 - Pr \times f_i, \quad (1)$$

where Pr is the prior probability of the trajectory matching a particular stored trajectory cluster (i.e., $Pr=P(t \in C_k)$, $C_k$ being the cluster), and $f_i$ is a probability of the received trajectory being greater than a given distance from the matching trajectory cluster (i.e., $f_i = P(d \geq d_i \forall t \in C_k)$, $d_i$ being the given distance). Equation (1) assumes that the trajectory matches an existing cluster that is mature, i.e., has a predefined number (e.g., 10) of training trajectories that previously mapped to the cluster. In one embodiment, the trajectory may need to match a cluster and also satisfy:

$$d_i \leq d_m \wedge d_{i+1} > d_m, \quad (2)$$

where $d_m$ is the matching distance between the trajectory and the cluster, $d_i$ and $d_{i+1}$ are distances in the intra-cluster probability distribution, with corresponding intra-cluster probabilities $f_i$ and $f_{i+1}$.

If the trajectory does not match an existing cluster that is mature, then the anomaly score may be taken to be $$S = 1.0 \quad (3)$$

if no clusters exist (i.e., the trajectory is being added to the very first cluster); or $$S = 1.0 - \frac{C_{closest}}{C_{total}} \times \frac{1.0}{1 + ce^{a \times d_{closest}}}, \quad (4)$$

where $d_{closest}$ is the matching distance to the closest cluster, $C_{closest}$ is a count of trajectories in the closest clustet, $C_{total}$ is a count of all observed trajectories, and c and a are tuning parameters; and $$S = 1.0 - \frac{1}{C_{total}} \quad (5)$$

otherwise.

Figure 4:
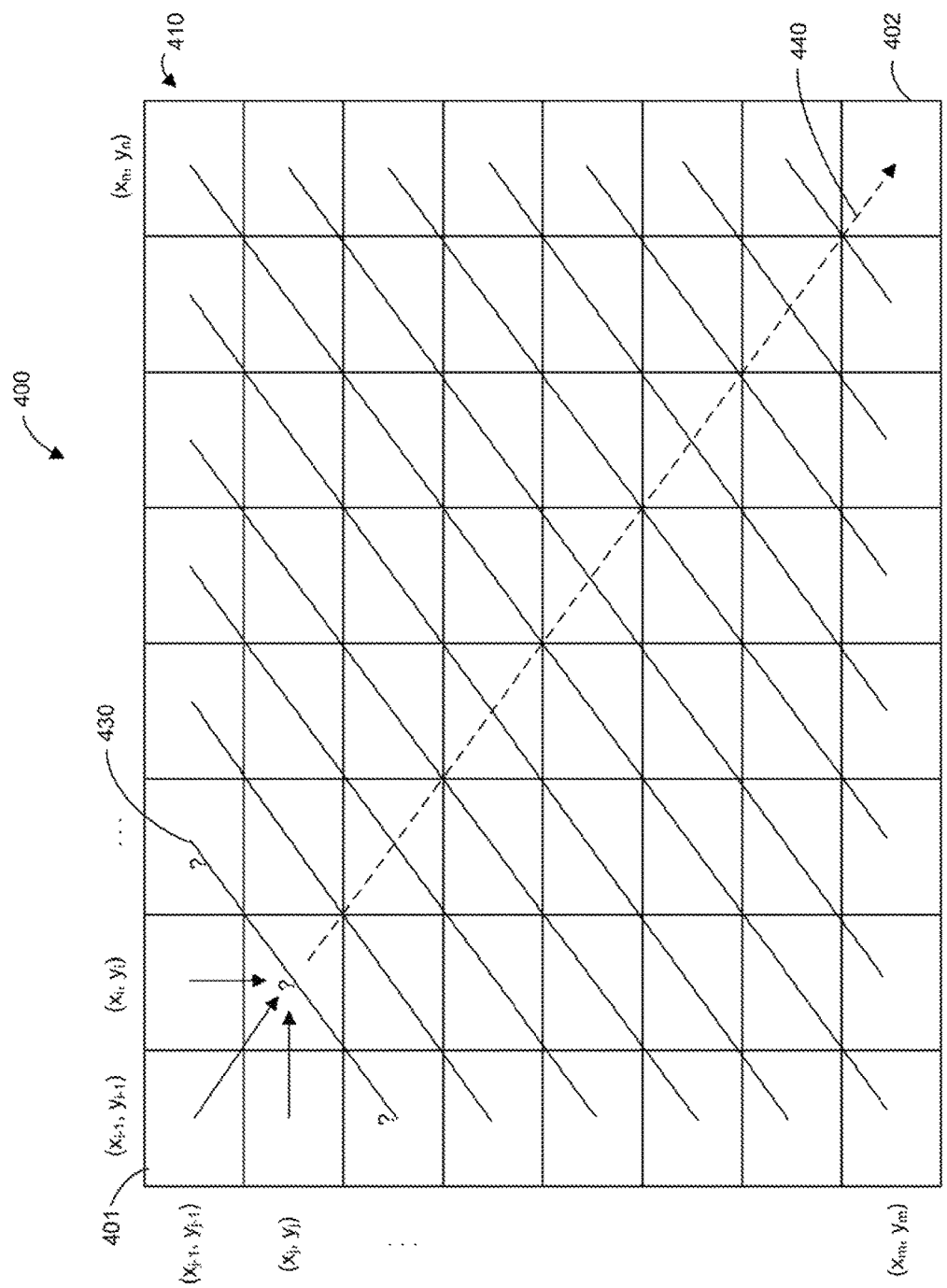
FIG. 4 illustrates a parallel implementation of a dynamic programming algorithm for determining distances between trajectories and between trajectories and trajectory clusters, according to an embodiment.

FIG. 4 illustrates a parallel implementation of a dynamic programming algorithm for determining distances between trajectories and between trajectories and trajectory clusters, according to an embodiment. In one embodiment, the dynamic programming algorithm may be the Needleman-Wunsch algorithm, described in Needleman, Saul B., and Wunsch, Christian D., "A general method applicable to the search for similarities in the amino acid sequence of two proteins," Journal of Molecular Biology 48(3): 443-53 (1970), which is incorporated by reference herein in its entirety. As shown, the trajectory analyzer 230 may begin by creating an m×n matrix 400 with an upper-left corner cell 401 initialized to 0, the m coordinates $(x_i, y_i)$ of a first trajectory in a first row 410, and the n coordinates $(x_j, y_j)$ of a second trajectory or a trajectory cluster mean in a first column 420. The trajectory analyzer 230 then computes a matching distance dm for each cell of the matrix 400 based on neighboring cells, specifically cells that are above (also referred to herein as the "upper" cell), to the left of, and to the upper-left of the cell. Doing so decomposes the problem into many simple problems involving finding the matching distance dm for individual cells that are then used to determine the overall matching distance between two trajectories or between a trajectory and a trajectory cluster mean.

According to the Needleman-Wunsch algorithm, the matching distance for each cell depends on whether the coordinates $(x_i, y_i)$ of the first trajectory match the coordinates $(x_j, y_j)$ of the second trajectory, or if instead there is a mismatch between the coordinates or an insertion or deletion where a coordinate aligns with a "gap" that may be penalized in the matching distance dm. In one embodiment, the penalty assigned to a gap may be a heuristic tuning parameter. As a result of the gap penalty, two trajectories that align with gaps may be a greater distance apart than two trajectories that align without gaps. It should be understood that time information is also implicitly encoded with the gap penalties. Mathematically, the matrix 400, represented by D(i, j), may be built recursively subject to boundary conditions, as follows:

$$D(i, j) = \min \begin{cases} D(i-1, j-1) + s((x_i, y_i), (x_j, y_j)) \\ D(i-1, j) + g \\ D(i, j-1) + g \end{cases} \quad (6)$$

where $s((x_i, y_i), (x_j, y_j))$ is a substitution score for positions i and j in the trajectory and g is the gap penalty.

In general, the trajectory analyzer 230 may fill in the matrix 400 with matching distances computed based on the upper, left, and upper left neighbors of each cell according to the Needleman-Wunsch algorithm and trace a path from the upper-left corner cell 401 to the bottom-right corner cell 402, with the minimum matching distance value from the upper, left, and upper-left cells being added to an overall distance at each step of the traced path. The trajectory analyzer 230 may further trace another path back from the bottom-right corner cell 402 to the upper-left corner cell 401, according to the Needleman-Wunsch algorithm, by picking the minimum matching distance of the upper, left, and upper-left cells at each step.

As shown, the parallel implementation of the Needleman-Wunsch algorithm computes antidiagonals $430_i$ of the matrix 400, and all connected sub-matrices, in parallel. As the matching distance at each matrix cell depends only on the upper, left, and upper-left cells relative to that matrix cell (equation (6)), each of the cells along an antidiagonal $430_i$ may be computed at the same time. Computing the matching distances along one of the antidiagonals $430_i$ further provides the upper, left, and upper-left matching distances needed for the computation of matching distances for cells in a next antidiagonal that is to the lower-left of the previous antidiagonal, and so on. That is, the matching distances for cells of matrix 400 may be computed in parallel along successive antidiagonals $430_i$ propagating from the upper-left to the bottom-right of the matrix 400, i.e., along the line 440. By computing such antidiagonal cell matching distances in parallel, the computation speed may be improved from O(m×n) to O(m+n), where as discussed m is the number of coordinates in the first trajectory being compared and n is the number of coordinates in the second trajectory (or trajectory cluster mean). That is, this parallel approach significantly improves the computation speed from the quadratic time, O(m×n), to the linear time, O(m+n).

Figure 5:
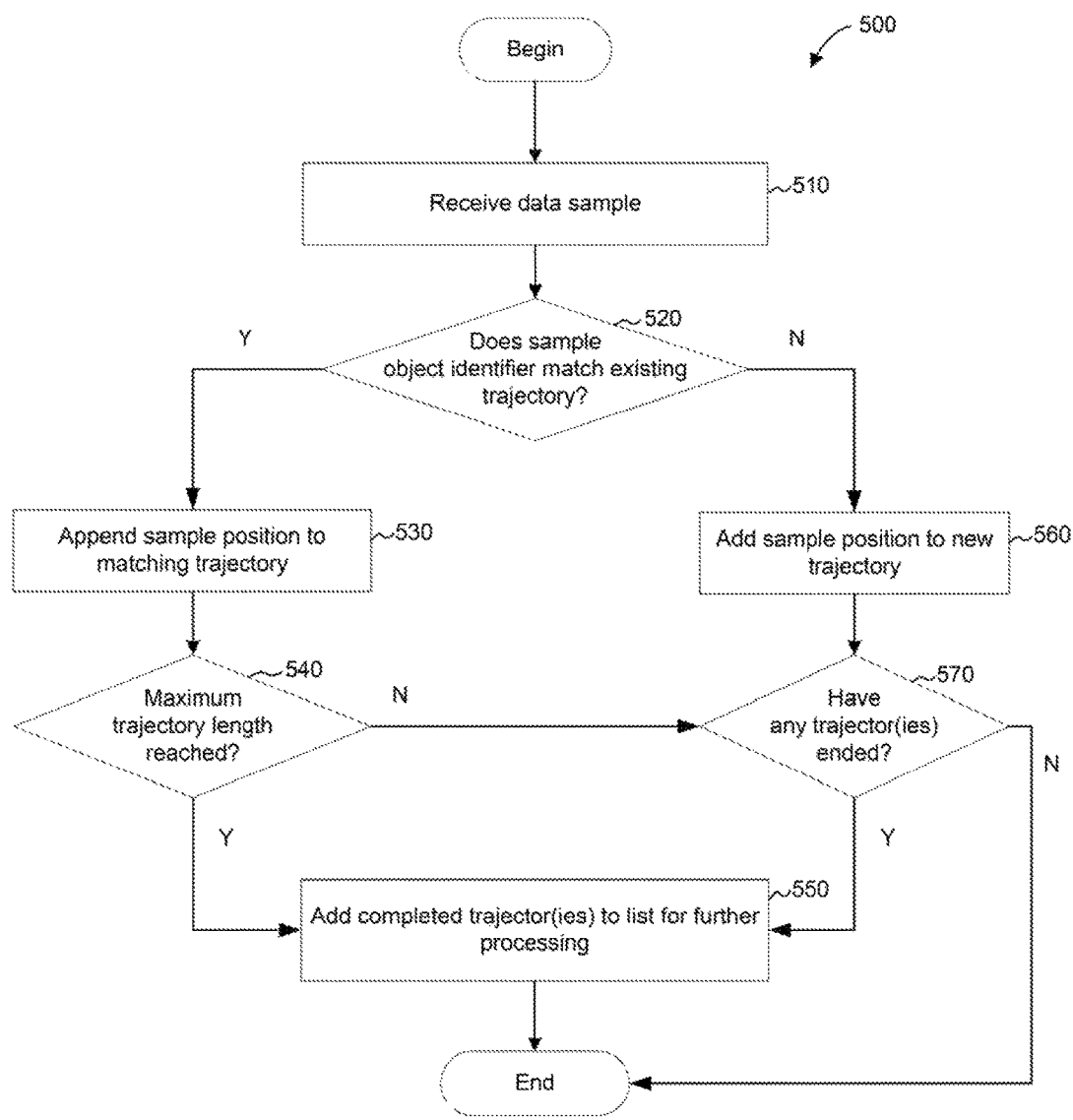
FIG. 5 illustrates a method for assembling trajectories, according to an embodiment.

FIG. 5 illustrates a method 500 for assembling trajectories, according to an embodiment. As shown, the method 500 begins at step 510, where the trajectory assembler 210 receives a tracking data sample which includes an (x,y) position and an object identifier, which may include a camera identifier and a tracked subject identifier and which specifies the object being tracked that is located at the (x,y) position. As discussed, such data samples may be received at a predefined data rate from a video driver that tracks objects in a scene depicting in a stream of video frames. Although receipt of a single data sample is shown for simplicity, in some embodiments the trajectory assembler 210 may receive and process multiple data samples in parallel. Where video streams from multiple cameras are being processed simultaneously, the data sample may also include a camera identifier specifying the camera whose video stream was used to derive the data sample. As discussed, the data sample may be derived by separating scene foreground from background, identifying objects in the foreground based on various kinematic and/or appearance features of objects, and tracking the position of the objects over time.

At step 520, the trajectory assembler 210 determines whether the object identifier of the received data sample matches that of an existing trajectory, stored in trajectory buffer 220. If such a match is found, then the trajectory assembler 210 appends the (x,y) position of the received data sample to the matching trajectory at step 530. At step 540, the trajectory assembler 210 further determines whether the matching trajectory now has a length that exceeds a maximum trajectory length. The maximum trajectory length may be a predefined length specifying the maximum number (e.g., 1024) of (x,y) position coordinates each trajectory can have so that trajectories exceeding the maximum length are considered completed. Such completed trajectories are then added to a list of trajectories for further processing, such as clustering and scoring, at step 550.

If no match is found between the object identifier of the received data sample and an existing trajectory at step 520, then at step 560, the trajectory assembler 210 creates a new trajectory including the (x,y) position of the received data sample and adds the new trajectory to the trajectory buffer 220. At step 570, which follows either step 560 or step 540 if the maximum trajectory length has not been reached, the trajectory assembler 210 determines whether any trajector(ies) have ended. A trajectory may end if no new data samples matching the trajectory's object identifier are being observed, such as when the tracked object has disappeared from the scene, in which case the trajectory assembler may add the trajectory to the completed trajectory list at step 550.

Figure 6:
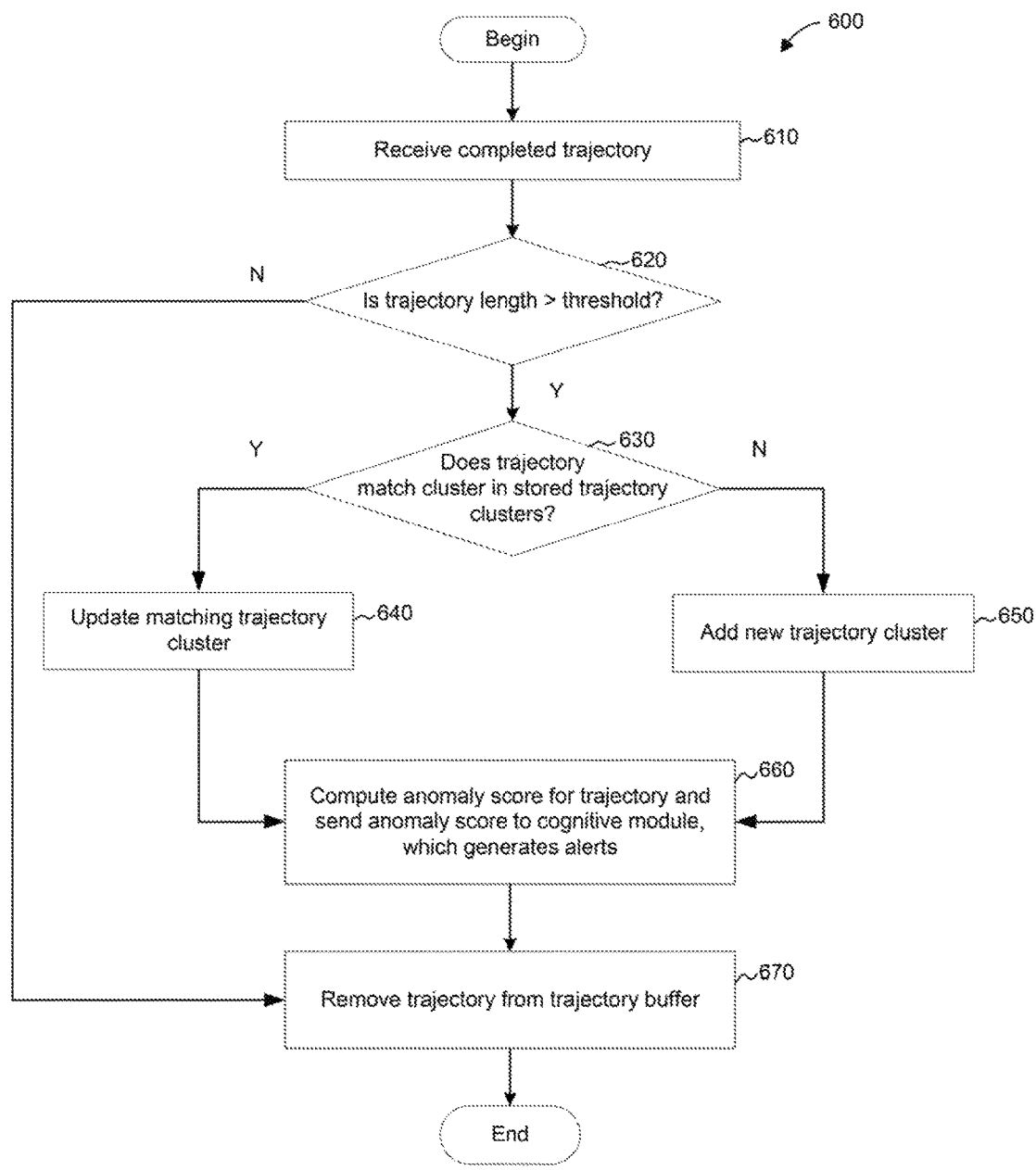
FIG. 6 illustrates a method for clustering and scoring trajectories, according to an embodiment.

FIG. 6 illustrates a method 600 for clustering and scoring trajectories, according to an embodiment. As shown, the method 600 begins at step 610, where the trajectory analyzer 230 receives a completed trajectory. In one embodiment, the completed trajectory may be a next trajectory extracted from a completed trajectory list created by the trajectory assembler 210 according to the method 500, discussed above.

At step 620, the trajectory analyzer 230 determines whether the received trajectory is greater than a threshold length. The threshold length may specify a minimum number of points required to be in the trajectory, thereby reducing noise caused by having many short or fragmented trajectories. If the trajectory is less than the threshold length, then the trajectory analyzer 230 does not analyze the trajectory further and proceeds directly to step 670, where the trajectory analyzer 230 removes the trajectory from the trajectory buffer 220.

If the trajectory analyzer 230 determines at step 620 that the received trajectory is greater than the threshold length, then at step 630, the trajectory analyzer 230 determines whether the received trajectory matches a cluster in the stored trajectory clusters 242. The match to a cluster may be determined based on a distance to the cluster, or any other suitable criteria. For example, clustering may be performed via the leader-follower algorithm, and, in such a case, the match to the cluster may be determined based on whether a distance of the trajectory from the cluster is less than a given threshold. In one embodiment, the distance itself that is used in clustering and matching to a cluster may be determined via the parallel implementation of the Needleman-Wunsch algorithm discussed above with respect to FIG. 4, in which cells in antidiagonals of the Needleman-Wunsch algorithm matrix and all connected sub-matrices are computed in parallel.

If a matching trajectory cluster is identified at step 630, then at step 640, the trajectory analyzer 230 updates the matching trajectory cluster based on the newly received trajectory. In one embodiment, the trajectory analyzer 230 may update the matching trajectory cluster's mean with the received trajectory. Otherwise, if no matching trajectory cluster is identified at step 630, then at step 650, the trajectory analyzer 230 creates a new trajectory cluster to be stored with the other trajectory clusters 242.

At step 660, the trajectory analyzer 230 computes an anomaly score for the received trajectory and sends the anomaly score to the cognitive module 250, which as discussed is responsible for learning normal and unusual trajectories and generating alerts for unusual trajectories that, e.g., exceed a threshold of rareness learned from historical data. In one embodiment, the anomaly score may be computed based on a joint probability computed as the product of a prior probability of the trajectory matching to a trajectory cluster (or a best-match cluster if the trajectory does not match to any mature cluster) and the intra-cluster probability of the trajectory being at a computed distance from the matching (or best-match) cluster's mean. In such a case, the prior probability may be based on a count of the number of trajectories that have previously been matched to the cluster, as well as a decay decrementing the count by a fractional number over time, and the intra-cluster probability distribution may be based on a histogram indicating the number of trajectories in the cluster that have been at least various distances from the cluster mean, as discussed above in detail with respect to FIG. 3. Both prior probabilities and intra-cluster probability distributions may be built and stored as part of the trajectory model 240, and the anomaly score may be computed according to equation (1), in which the prior probability and the intra-cluster probability for the received trajectory are multiplied together, or according to equations (3)-(5) in cases where the no mature trajectory cluster exists to which the received trajectory matches.

Then at step 670, the trajectory analyzer 230 removes the received complete trajectory that has been processed from the trajectory buffer 220 and decays all clusters other than the cluster that was updated or created at steps 640 and 650, respectively. As discussed, decaying a cluster may include decrementing the count of observed trajectories in the cluster by a predefined fractional number.

Advantageously, techniques disclosed herein build models given trajectories of objects in a scene depicted in video frames captured by a video camera, determine unusual trajectories based on the models, and report the unusual trajectories so that, e.g., a user can investigate the causes of the unusual trajectories. An anomaly score indicating how unusual a corresponding trajectory is may be determined based on a joint probability computed as the product of a prior probability indicating probability of the trajectory mapping to a trajectory cluster and an intra-cluster probability indicating probability of the trajectory being at least a computed distance from the trajectory cluster. In addition, the distance used to match a trajectory to a trajectory cluster and determine the intra-cluster probability may be computed using a parallel dynamic programming technique, such as a Needleman-Wunsch algorithm in which cells in antidiagonals of the Needleman-Wunsch algorithm matrix and all connected submatrices are computed in parallel, thereby improving the computational efficiency.

While the foregoing is directed to embodiments of the present invention, other and further embodiments of the invention may be devised without departing from the basic scope thereof, and the scope thereof is determined by the claims that follow.

What is claimed is:

1. A computer-implemented method for analyzing trajectories of objects depicted in video frames captured by a plurality of video cameras, comprising:

acquiring, via a video driver, a plurality of data streams to track an object, the plurality of data streams being processed video frames from a plurality of video cameras, each data stream including a tracked subject identifier that specifies the object being tracked, and a camera identifier associated with a corresponding video camera of the plurality of video cameras;

calculating, via at least one processor, a first distance between a received trajectory for the object in a first data stream of the plurality of data streams and a stored trajectory cluster from a plurality of stored trajectory clusters based on the tracked subject identifier;

determining, based on the first distance, whether the received trajectory maps to the stored trajectory cluster; and upon determining that the received trajectory maps to the stored trajectory cluster:

determining a first score based on at least a joint probability computed as a product of a probability of the received trajectory mapping to the stored trajectory cluster and the probability of the received trajectory being the first distance from the stored trajectory cluster, and upon determining that the first score exceeds a threshold value, issuing an alert to a user, the alert indicating an anomaly in the received trajectory of the object.

2. The method of claim 1, further comprising generating a new trajectory including an (x,y) position of the object upon determining that the received trajectory does not map to the stored trajectory cluster, and storing the new trajectory in a trajectory buffer.

3. The method of claim 1, wherein:
the probability of the received trajectory mapping to the stored trajectory cluster is determined based on at least a count of previous trajectories for the object which mapped to the stored trajectory cluster based on the tracked subject identifier.

4. The method of claim 1, wherein the first score is determined as $S=1.0-Pr \times f_i$, Pr being the probability of the received trajectory mapping to the stored trajectory cluster, and $f_i$ being the probability of the received trajectory being the first distance from the stored trajectory cluster.

5. The method of claim 1, wherein:
the stored trajectory cluster includes an ordered list of points in a two-dimensional (2D) image-pixel space; and
the first distance between the received trajectory and the stored trajectory cluster is a distance between a list of points of the received trajectory and the list of points of the stored trajectory cluster determined based on a dynamic programming technique.

6. The method of claim 5, wherein:
the dynamic programming technique is a Needleman-Wunsch algorithm; and
cells in antidiagonals of a matrix used in the Needleman-Wunsch algorithm and all connected sub-matrices are computed in parallel.

7. The method of claim 1, further comprising:
upon determining that the received trajectory does not map to a stored trajectory cluster:
determining a second score based on at least a cumulative probability distribution indicating a probability of the received trajectory being at least a second distance from a mature stored trajectory cluster that best matches the received trajectory, and
upon determining that the second score exceeds a second threshold value, issuing an alert to the user.

8. The method of claim 1, wherein the received trajectory is assembled by appending tracked positions of the object to the received trajectory.

9. The method of claim 8, wherein assembling the received trajectory includes:
clustering raw tracked object positions; and
appending the clustered tracked positions to the received trajectory.

10. A non-transitory computer-readable storage medium storing instructions, which when executed by a computer system, perform operations to:
acquire a plurality of data streams to track an object, the plurality of data streams being processed video frames from a plurality of video cameras, each data stream including a tracked subject identifier that specifies the object being tracked, and a camera identifier associated with a corresponding video camera of the plurality of video cameras;

calculate a first distance between a received trajectory for the object in a first data stream of the plurality of data streams and a stored trajectory cluster from a plurality of stored trajectory clusters based on the tracked subject identifier;

determine, based on the first distance, whether the received trajectory maps to the stored trajectory cluster; and upon a determination that the received trajectory maps to the stored trajectory cluster:
determine a first score based on at least a joint probability computed as a product of a probability of the received trajectory mapping to the stored trajectory cluster and the probability of the received trajectory being the first distance from the stored trajectory cluster, and
upon a determination that the first score exceeds a threshold value, issue an alert to a user, the alert indicating an anomaly in the received trajectory of the object.

11. The non-transitory computer-readable storage medium of claim 10, wherein:
the probability of the received trajectory mapping to the stored trajectory cluster is determined based on at least a count of previous trajectories for the object which mapped to the stored trajectory cluster based on the tracked subject identifier.

12. The non-transitory computer-readable storage medium of claim 10, wherein the first score is determined as $S=1.0-Pr \times f_i$, Pr being the probability of the received trajectory mapping to the stored trajectory cluster, and $f_i$ being the probability of the received trajectory being the first distance from the stored trajectory cluster.

13. The non-transitory computer-readable storage medium of claim 10, wherein:
the stored trajectory cluster includes an ordered list of points in a two-dimensional (2D) image-pixel space; and
the first distance between the received trajectory and the stored trajectory cluster is a distance between a list of points of the received trajectory and the list of points of the stored trajectory cluster determined based on a dynamic programming technique.

14. The non-transitory computer-readable storage medium of claim 13, wherein:
the dynamic programming technique is a Needleman-Wunsch algorithm; and
cells in antidiagonals of a matrix used in the Needleman-Wunsch algorithm and all connected sub-matrices are computed in parallel.

15. The non-transitory computer-readable storage medium of claim 10, the operations further comprising:
upon a determination that the received trajectory does not map to a stored trajectory cluster:
determine a second score based on at least a second cumulative probability distribution indicating probability of the received trajectory being at least a second distance from a mature stored trajectory cluster that best matches the received trajectory, and
upon a determination that the second score exceeds a second threshold value, issue an alert to the user.

16. The non-transitory computer-readable storage medium of claim 10, wherein the received trajectory is assembled by appending tracked positions of the object to the received trajectory.

17. The computer-readable storage medium of claim 16, wherein instructions to assemble the received trajectory includes operations to:
- cluster raw tracked object positions; and
- append the clustered tracked positions to the received trajectory.

18. A system, comprising:
- a processor; and
- a memory in communication with the processor, wherein the memory includes an application program configured to perform operations to:
- acquire a plurality of data streams to track an object, the plurality of data streams being processed video frames from a plurality of video cameras, each data stream including a tracked subject identifier that specifies the object being tracked, and a camera identifier associated with a corresponding video camera of the plurality of video cameras;
- calculate a first distance between a received trajectory for the object in a first data stream of the plurality of data streams and a stored trajectory cluster from a plurality of stored trajectory clusters based on the tracked subject identifier;
- determine, based on the first distance, whether the received trajectory maps to the stored trajectory cluster; and
- upon a determination that the received trajectory maps to the stored trajectory cluster:
  - determine a first score based on at least a joint probability computed as a product of a probability of the received trajectory mapping to the stored trajectory cluster and the probability of the received trajectory being the first distance from the stored trajectory cluster, and
  - upon a determination that the first score exceeds a threshold value, issue an alert to a user, the alert indicating an anomaly in the received trajectory of the object.

19. The system of claim 18, wherein:
the first distance between the received trajectory and the stored trajectory cluster is a distance between a list of points of the received trajectory and the list of points of the stored trajectory cluster determined based on a Needleman-Wunsch algorithm; and
cells in antidiagonals of a matrix used in the Needleman-Wunsch algorithm and all connected sub-matrices are computed in parallel.

20. The system of claim 18, the application program further configured to perform operations to generate a new trajectory including an (x,y) position of the object upon determining that the received trajectory does not map to the stored trajectory cluster, and storing the new trajectory in a trajectory buffer.

* * * * *